(12) United States Patent
Klassen

(10) Patent No.: US 8,488,196 B2
(45) Date of Patent: Jul. 16, 2013

(54) METHOD AND SYSTEM FOR COLOR CORRECTION USING BOTH SPATIAL CORRECTION AND PRINTER CALIBRATION TECHNIQUES

(75) Inventor: R. Victor Klassen, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/326,943

(22) Filed: Dec. 15, 2011

(65) Prior Publication Data

US 2012/0086962 A1 Apr. 12, 2012

Related U.S. Application Data

(62) Division of application No. 11/315,045, filed on Dec. 22, 2005, now Pat. No. 8,102,564.

(51) Int. Cl.
*H04N 1/58* (2006.01)
*H04N 1/60* (2006.01)

(52) U.S. Cl.
USPC .............................. 358/1.9; 358/3.26; 358/504

(58) Field of Classification Search
USPC ......... 358/1.9, 2.1, 3.21–3.27, 504, 518–523, 358/530, 532, 540; 347/19, 107, 115; 399/9, 399/15, 39, 72
See application file for complete search history.

(56) References Cited

U.S. PATENT DOCUMENTS

| | | | |
|---|---|---|---|
| 4,473,298 A | 9/1984 | Sakamoto | |
| 4,516,175 A | 5/1985 | Jung et al. | |
| 4,579,446 A | 4/1986 | Fujino et al. | |
| 4,587,532 A | 5/1986 | Asano | |
| 4,836,119 A | 6/1989 | Siraco et al. | |
| 5,004,222 A | 4/1991 | Dobashi | |
| 5,060,013 A | 10/1991 | Spence | |
| 5,080,340 A | 1/1992 | Hacknauer et al. | |
| 5,095,342 A | 3/1992 | Farrell et al. | |
| 5,159,395 A | 10/1992 | Farrell et al. | |
| 5,208,640 A | 5/1993 | Horie et al. | |
| 5,272,511 A | 12/1993 | Conrad et al. | |
| 5,326,093 A | 7/1994 | Sollitt | |
| 5,416,613 A * | 5/1995 | Rolleston et al. | ............. 358/504 |
| 5,435,544 A | 7/1995 | Mandel | |
| 5,473,419 A | 12/1995 | Russel et al. | |
| 5,489,969 A | 2/1996 | Soler et al. | |
| 5,504,568 A | 4/1996 | Saraswat et al. | |
| 5,525,031 A | 6/1996 | Fox | |
| 5,557,367 A | 9/1996 | Yang et al. | |
| 5,568,246 A | 10/1996 | Keller et al. | |
| 5,570,172 A | 10/1996 | Acquaviva | |
| 5,596,416 A | 1/1997 | Barry et al. | |
| 5,604,567 A | 2/1997 | Dundas et al. | |

(Continued)

OTHER PUBLICATIONS

Morgan, P.F., "Integration of Black Only and Color Printers", Xerox Disclosure Journal, vol. 16, No. 6, Nov./Dec. 1991, pp. 381-383.

(Continued)

*Primary Examiner* — Scott A Rogers
(74) *Attorney, Agent, or Firm* — Fay, Sharpe LLP

(57) ABSTRACT

A system using a spatial correction to improve the result of a printer calibration and correction is described. More particularly, in one form, a spatial correction may be used to precondition a printer for an improved color calibration. In another form, spatial correction and color calibration are addressed in the same process for color correction.

20 Claims, 6 Drawing Sheets

U.S. PATENT DOCUMENTS

| | | | |
|---|---|---|---|
| 5,629,762 | A | 5/1997 | Mahoney et al. |
| 5,710,968 | A | 1/1998 | Clark et al. |
| 5,748,330 | A | 5/1998 | Wang et al. |
| 5,760,913 | A | 6/1998 | Falk |
| 5,778,377 | A | 7/1998 | Marlin et al. |
| 5,784,667 | A | 7/1998 | Mestha et al. |
| 5,790,281 | A | 8/1998 | Knox et al. |
| 5,838,465 | A * | 11/1998 | Satou et al. .................. 358/504 |
| 5,884,910 | A | 3/1999 | Mandel |
| 5,995,721 | A | 11/1999 | Rourke et al. |
| 6,059,284 | A | 5/2000 | Wolf et al. |
| 6,122,075 | A * | 9/2000 | Yamada et al. ............... 358/504 |
| 6,125,248 | A | 9/2000 | Moser |
| 6,241,242 | B1 | 6/2001 | Munro |
| 6,297,886 | B1 | 10/2001 | Cornell |
| 6,341,773 | B1 | 1/2002 | Aprato et al. |
| 6,345,117 | B2 | 2/2002 | Klassen |
| 6,384,918 | B1 | 5/2002 | Hubble, III et al. |
| 6,441,923 | B1 | 8/2002 | Balasubramanian et al. |
| 6,450,711 | B1 | 9/2002 | Conrow |
| 6,474,768 | B1 * | 11/2002 | Yano et al. ....................... 347/19 |
| 6,476,376 | B1 | 11/2002 | Biegelsen et al. |
| 6,476,923 | B1 | 11/2002 | Cornell |
| 6,493,098 | B1 | 12/2002 | Cornell |
| 6,494,557 | B1 * | 12/2002 | Kato et al. ...................... 347/19 |
| 6,537,910 | B1 | 3/2003 | Burke et al. |
| 6,550,762 | B2 | 4/2003 | Stoll |
| 6,554,276 | B2 | 4/2003 | Jackson et al. |
| 6,577,925 | B1 | 6/2003 | Fromherz |
| 6,607,320 | B2 | 8/2003 | Bobrow et al. |
| 6,608,988 | B2 | 8/2003 | Conrow |
| 6,612,566 | B2 | 9/2003 | Stoll |
| 6,612,571 | B2 | 9/2003 | Rider |
| 6,621,576 | B2 | 9/2003 | Tandon et al. |
| 6,633,382 | B2 | 10/2003 | Hubble, III et al. |
| 6,639,669 | B2 | 10/2003 | Hubble, III et al. |
| 6,714,748 | B1 * | 3/2004 | Nakayasu et al. ............... 399/72 |
| 6,760,056 | B2 | 7/2004 | Klassen et al. |
| 6,775,029 | B1 | 8/2004 | Wen et al. |
| 6,819,906 | B1 | 11/2004 | Herrmann et al. |
| 6,853,464 | B1 * | 2/2005 | Ueda et al. ..................... 358/1.9 |
| 6,911,993 | B2 * | 6/2005 | Nishikawa et al. ........... 347/116 |
| 6,925,283 | B1 | 8/2005 | Mandel et al. |
| 6,959,165 | B2 | 10/2005 | Mandel et al. |
| 7,069,164 | B2 * | 6/2006 | Viturro et al. .................. 358/1.9 |
| 7,088,471 | B2 | 8/2006 | Marumoto et al. |
| 7,099,024 | B2 * | 8/2006 | Yagi .............................. 358/504 |
| 7,130,076 | B2 | 10/2006 | Shibuya et al. |
| 7,206,068 | B2 | 4/2007 | Suzuki |
| 7,245,842 | B2 | 7/2007 | Hino |
| 7,315,394 | B2 * | 1/2008 | Klassen et al. ................ 358/504 |
| 7,394,566 | B2 | 7/2008 | Yao |
| 7,443,535 | B2 * | 10/2008 | Ishibashi ....................... 358/504 |
| 7,486,416 | B2 | 2/2009 | Dalal et al. |
| 7,522,308 | B2 * | 4/2009 | Ueda .............................. 358/1.9 |
| 7,869,087 | B2 | 1/2011 | Wang et al. |
| 7,899,341 | B2 * | 3/2011 | Moro ............................... 399/15 |
| 8,009,320 | B2 * | 8/2011 | Bae ............................... 358/504 |
| 8,102,564 | B2 * | 1/2012 | Klassen ........................ 358/1.9 |
| 2001/0033686 | A1 | 10/2001 | Klassen |
| 2002/0067849 | A1 | 6/2002 | Klassen et al. |
| 2002/0078012 | A1 | 6/2002 | Ryan et al. |
| 2002/0103559 | A1 | 8/2002 | Gartstein |
| 2003/0063302 | A1 | 4/2003 | Munger et al. |
| 2003/0077095 | A1 | 4/2003 | Conrow |
| 2004/0085561 | A1 | 5/2004 | Fromherz |
| 2004/0085562 | A1 | 5/2004 | Fromherz |
| 2004/0088207 | A1 | 5/2004 | Fromherz |
| 2004/0136015 | A1 | 7/2004 | Van de Capelle et al. |
| 2004/0150156 | A1 | 8/2004 | Fromherz et al. |
| 2004/0150158 | A1 | 8/2004 | Biegelsen et al. |
| 2004/0153983 | A1 | 8/2004 | McMillan |
| 2004/0165199 | A1 | 8/2004 | Klassen et al. |
| 2004/0216002 | A1 | 10/2004 | Fromherz et al. |
| 2004/0225391 | A1 | 11/2004 | Fromherz et al. |
| 2004/0225394 | A1 | 11/2004 | Fromherz et al. |
| 2004/0246528 | A1 | 12/2004 | Washio et al. |
| 2004/0247365 | A1 | 12/2004 | Lofthus et al. |
| 2004/0252905 | A1 | 12/2004 | Mizes et al. |
| 2004/0257595 | A1 | 12/2004 | Sharma et al. |
| 2004/0264768 | A1 | 12/2004 | Sharma et al. |
| 2004/0264769 | A1 | 12/2004 | Sharma et al. |
| 2004/0264771 | A1 | 12/2004 | Sharma et al. |
| 2005/0036159 | A1 | 2/2005 | Sharma et al. |
| 2007/0002344 | A1 | 1/2007 | Klassen |
| 2007/0086071 | A1 * | 4/2007 | Gila et al. ..................... 358/518 |
| 2007/0140552 | A1 | 6/2007 | Fan et al. |
| 2010/0118347 | A1 * | 5/2010 | Ishii .............................. 358/2.1 |
| 2010/0215392 | A1 * | 8/2010 | Shiraki et al. ................... 399/72 |
| 2011/0026082 | A1 * | 2/2011 | Miyadera et al. ............. 358/3.24 |
| 2011/0075162 | A1 * | 3/2011 | Saettel et al. ................. 358/1.9 |
| 2011/0148964 | A1 * | 6/2011 | Mochizuki et al. ............. 347/12 |
| 2011/0176157 | A1 * | 7/2011 | Katayama ..................... 358/1.9 |
| 2012/0081441 | A1 * | 4/2012 | Miyake et al. ................... 347/15 |

OTHER PUBLICATIONS

Desmond Fretz, "Cluster Printing Solution Announced", Today at Xerox (TAX), No. 1129, Aug. 3, 2001.

Keith Knox, "Integrating Cavity Effect in Scanners," Proceedings on IS&T/OSA Conference on Optics and Imaging in the Information Age, Rochester, pp. 156-158 (1996).

G. Sharma, S. Wang, D. Sidavanahalli and K. Knox, "The Impact of UCR on Scanner Calibration," in Proc PICS Conf., pp. 121-124, Portland, OR (1998).

V. Ostromoukhov, R.D. Hersch, C. Peraire, P. Emmel and I. Amidror, "Two Approaches in Scanner-Printer Calibration: Colorimetric Space-Based vs. Closed-Loop," in Proc SPIE 2170, pp. 133-142 (1994).

J. Hardeberg, "Desktop Scanning to sRGB," in IS&T and SPIE's Device Independent Color, Color Hardcopy and Graphic Arts V, San Jose, CA (Jan. 2000).

H. Haneishi, T. Hirao, A. Shimazu and Y. Miyake, "Colorimetric Precision in Scanner Calibration Using Matrices," in Proceedings of IS&T and SID'S $3^{rd}$ Color Imaging Conference: Color Science, Systems and Applications, pp. 106-108, Scottsdale, Arizona (Nov. 1995).

A.R. Rao, "Color Calibration of a Colorimetric Scanner Using Non-Linear Least Squares," in Proc. IS&T's 1998 PICS Conference, Portland, OR (May 1998).

J. Hardeberg, "Acquisition and Reproduction of Colour Images: Colorimetric and Multispectral Approaches," Doctoral Dissertation, l'Ecole Nationale Superieure des Telecommunications, Paris (1999).

U.S. Appl. No. 10/761,522, filed Jan. 21, 2004, Mandel, et al.
U.S. Appl. No. 10/785,211, filed Feb. 24, 2004, Lofthus, et al.
U.S. Appl. No. 10/881,619, filed Jun. 30, 2004, Bobrow.
U.S. Appl. No. 10/917,676, filed Aug. 13, 2004, Lofthus, et al.
U.S. Appl. No. 10/917,768, filed Aug. 13, 2004, Lofthus, et al.
U.S. Appl. Np. 10/924,106, filed Aug. 23, 2004, Lofthus, et al.
U.S. Appl. No. 10/924,113, filed Aug. 23, 2004, deJong, et al.
U.S. Appl. No. 10/924,458, filed Aug. 23, 2004, Lofthus, et al.
U.S. Appl. No. 10/924,459, filed Aug. 23, 2004, Mandel, et al.
U.S. Appl. No. 10/933,556, filed Sep. 3, 2004, Spencer, et al.
U.S. Appl. No. 10/953,953, filed Sep. 29, 2004, Radulski, et al.
U.S. Appl. No. 10/999,326, filed Nov. 30, 2004, Grace, et al.
U.S. Appl. No. 10/999,450, filed Nov. 30, 2004, Lofthus, et al.
U.S. Appl. No. 11/000,158, filed Nov. 30, 2004, Roof.
U.S. Appl. No. 11/000,168, filed Nov. 30, 2004, Biegelsen, et al.
U.S. Appl. No. 11/000,258, filed Nov. 30, 2004, Roof.
U.S. Appl. No. 11/001,890, filed Dec. 2, 2004, Lofthus, et al.
U.S. Appl. No. 11/002,528, filed Dec. 2, 2004, Lofthus, et al.
U.S. Appl. No. 11/051,817, filed Feb. 4, 2005, Moore, et al.
U.S. Appl. No. 11/070,681, filed Mar. 2, 2005, Viturro, et al.
U.S. Appl. No. 11/081,473, filed Mar. 16, 2005, Moore.
U.S. Appl. No. 11/069,020, filed Feb. 28, 2005, Lofthus, et al.
U.S. Appl. No. 11/089,854, filed Mar. 25, 2005, Clark, et al.
U.S. Appl. No. 11/090,498, filed Mar. 25, 2005, Clark.
U.S. Appl. No. 11/090,502, filed Mar. 25, 2005, Mongeon.
U.S. Appl. No. 11/095,378, filed Mar. 31, 2005, Moore, et al.
U.S. Appl. No. 11/094,998, filed Mar. 31, 2005, Moore, et al.
U.S. Appl. No. 11/094,864, filed Mar. 31, 2005, de Jong, et al.
U.S. Appl. No. 11/095,872, filed Mar. 31, 2005, Julien, et al.

U.S. Appl. No. 11/102,355, filed Apr. 8, 2005, Fromherz, et al.
U.S. Appl. No. 11/084,280, filed Mar. 18, 2005, Mizes.
U.S. Appl. No. 11/109,566, filed Apr. 19, 2005, Mandel, et al.
U.S. Appl. No. 11/109,558, filed Apr. 19, 2005, Furst, et al.
U.S. Appl. No. 11/109,996, filed Apr. 20, 2005, Mongeon, et al.
U.S. Appl. No. 11/093,229, filed Mar. 29, 2005, Julien.
U.S. Appl. No. 11/102,899, filed Apr. 8, 2005, Crawford, et al.
U.S. Appl. No. 11/102,910, filed Apr. 8, 2005, Crawford, et al,.
U.S. Appl. No. 11/115,766, filed Apr. 27, 2005, Grace.
U.S. Appl. No. 11/102,332, filed Apr. 8, 2005, Hindi, et al.
U.S. Appl. No. 11/136,959, filed May 25, 2005, German, et al.
U.S. Appl. No. 11/136,821, filed May 25, 2005, Robinson.
U.S. Appl. No. 11/122,420, filed May 5, 2005, Richards.
U.S. Appl. No. 11/137,634, filed May 25, 2005, Lofthus, et al.
U.S. Appl. No. 11/137,251, filed May 25, 2005, Lofthus, et al.
U.S. Appl. No. 11/137,273, filed May 25, 2005, Anderson, et al.
U.S. Appl. No. 11/146,665, filed Jun. 7, 2005, Mongeon.
U.S. Appl. No. 11/152,275, filed Jun. 14, 2005, Roof et al.
U.S. Appl. No. 11/156,778, filed Jun. 20, 2005, Swift.
U.S. Appl. No. 11/157,598, filed Jun. 21, 2005, Frankel.
U.S. Appl. No. 11/166,299, filed Jun. 24, 2005, Moore.
U.S. Appl. No. 11/166,460, filed Jun. 24, 2005, Roof et al.
U.S. Appl. No. 11/166,581, filed Jun. 24, 2005, Lang et al.
U.S. Appl. No. 11/170,845, filed Jun. 30, 2005, Sampath et al.
U.S. Appl. No. 11/189,371, filed Jul. 26, 2005, Moore et al.
U.S. Appl. No. 11/208,871, filed Aug. 22, 2005, Delal et al.
U.S. Appl. No. 11/212,367, filed Aug. 26, 2005, Anderson et al.
U.S. Appl. No. 11/215, 791, filed Aug. 30, 2005, Hamby et al.
U.S. Appl. No. 11/222,260, filed Sep. 8, 2005, Goodman et al.
U.S. Appl. No. 11/234,468, filed Sep. 23, 2005, Hamby et al.
U.S. Appl. No. 11/234,553, filed Sep. 23, 2005, Mongeon.
U.S. Appl. No. 11/235,979, filed Sep. 27, 2005, Anderson et al.
U.S. Appl. No. 11/236,099, filed Sep. 27, 2005, Anderson et al.
U.S. Appl. No. 11/247,778, filed Oct. 11, 2005, Radulski et al.
U.S. Appl. No. 11/248,044, filed Oct. 12, 2005, Spencer et al.
U.S. Appl. No. 11/170,873, filed Jun. 30, 2005, Klassen.
U.S. Appl. No. 11/274,638, filed Nov. 15, 2005, Wu et al.
U.S. Appl. No. 11/287,177, filed Nov. 23, 2005, Mandel et al.
U.S. Appl. No. 11/291,860, filed Nov. 30, 2005, Willis.
U.S. Appl. No. 11/292,163, filed Nov. 30, 2005, Mandel et al.
U.S. Appl. No. 11/292,388, filed Nov. 30, 2005, Mueller.
U.S. Appl. No. 11/314,774, filed Dec. 21, 2005, Klassen.
U.S. Appl. No. 11/268,294, filed Nov. 4, 2005, Klassen.
U.S. Appl. No. 11/593,410, filed Nov. 6, 2006, Klassen.
U.S. Appl. No. 11/170,975, filed Jun. 30, 2005, Klassen.

* cited by examiner

METHOD AND SYSTEM FOR COLOR CORRECTION USING BOTH SPATIAL CORRECTION AND PRINTER CALIBRATION TECHNIQUES

This application is a divisional of U.S. Ser. No. 11/315,045, filed Dec. 22, 2005, which application is hereby incorporated herein by reference.

BACKGROUND

Color calibration for image rendering devices is well-known. Many techniques for correcting color in a printer, for example, have been and are being developed. For color consistency in color printing, however, there are situations where mere color correction or calibration is not sufficient. For example, pages might match on average as determined by a color correction or calibration technique, but they may differ significantly in some regions. When these pages are cut and compared, the resulting appearance may not meet expectations. Similarly, when multiple print engines are used, the outputs of the multiple engines can differ significantly. These differences may occur even if the resulting prints are identical in the one location on the page where they are measured, or identical on average across the page.

In this regard, substantial work has been done on techniques for implementing spatial corrections. Spatial corrections are implemented to correct for physical non-uniformities within the printer. For example, in situations where the printer includes multiple printing stations, different physical phenomena may be occurring at each of the separate stations. For example, roller pressures may differ from station to station. Significantly, pressures from the same roller may differ across a width of a page. This could result in an image differing from one side of the page to the other. As a further example, spatial corrections may be implemented to address non-uniformities associated with a particular photoreceptor, for example. In this regard, particularly when multiple print stations or multiple photoreceptors are used, toner may migrate from an intermediate transfer belt within the printer back to a photoreceptor in an undesired manner.

So, techniques have been developed to suitably apply spatial corrections to printing systems. In particular, these techniques are typically focused on one dimension, or a single color of printing. As discussed above, color calibration is also known. However, the use of techniques for spatial correction to pre-condition a printer to conduct a better color calibration has not yet been heretofore realized. It would be desirable to do so.

CROSS REFERENCE TO RELATED PATENTS AND APPLICATIONS

This application is related to U.S. patent application Ser. No. 10/945,600, filed Sep. 20, 2004, entitled "Calibration of Color Devices," naming Meng Yao as an inventor, and U.S. patent application Ser. No. 11/143,818, filed Jun. 2, 2005, entitled "Interseparation Decorrelator," naming Dalal, Wu, Loce, Bala, Zhang and Zeck, as inventors, and U.S. application Ser. No. 10/465,408, filed Jun. 18, 2003 (Publication No. US 2004/0257595 A1), entitled "Two-Dimensional Calibration Architectures for Color Devices," naming Sharma et al. as inventors. All three of these applications are incorporated herein in their entirety by this reference.

INCORPORATION BY REFERENCE

U.S. patent application Ser. No. 10/945,600, filed Sep. 20, 2004, entitled "Calibration of Color Devices," naming Meng Yao as an inventor, and U.S. patent application Ser. No. 11/143,818, filed Jun. 2, 2005, entitled "Interseparation Decorrelator," naming Dalal, Wu, Loce, Bala, Zhang and Zeck, as inventors are incorporated herein in their entirety by this reference.

The following applications and patents are also incorporated herein by this reference: U.S. application Ser. No. 10/465,408, filed Jun. 18, 2003 (Publication No. US 2004/0257595 A1), entitled "Two-Dimensional Calibration Architectures for Color Devices," naming Sharma et al. as inventors, U.S. Pat. No. 6,760,056 to Klassen et al., U.S. application Ser. No. 11/170,873, filed Jun. 30, 2005, entitled "Color Characterization or Calibration Targets with Noise-Dependent Patch Size or Number," by R. Victor Klassen; U.S. application Ser. No. 11/170,975, filed Jun. 30, 2005, entitled "Method and System for Processing Scanned Patches for Use in Imaging Device Calibration," by R. Victor Klassen; U.S. application Ser. No. 11/268,294, filed Nov. 4, 2005, entitled "A Method for Correcting Integrating Cavity Effect for Calibration and/or Characterization Targets,", by R. Victor Klassen; and, U.S. application Ser. No. 60/733,467, filed Nov. 4, 2005, entitled "Scanner Characterization for Printer Calibration," by R. Victor Klassen.

BRIEF DESCRIPTION

It is one objective of the presently described embodiments to apply concepts of both spatial correction and printer calibration in various combinations to obtain an improved color consistency in printing. In one aspect of the presently described embodiments, the method comprises printing a test pattern, measuring the test pattern, analyzing the measured printed test pattern, selectively applying a spatial correction to the printer based on the test pattern, and, selectively calibrating the printer based on the test pattern (or a second test pattern).

In another aspect of the presently described embodiments, the spatial correction includes applying a spatially dependent decorrelating function based on a spatial location description.

In another aspect of the presently described embodiments, the color calibration comprises summing a grey balance contribution, a secondary color contribution and a primary color contribution.

In another aspect of the presently described embodiments, the color calibration comprises computing an arithmetic combination of two separations and using the computed combination and a third separation as addresses in a two dimensional lookup table.

In another aspect of the presently described embodiments, the measuring comprises scanning.

In another aspect of the presently described embodiments, the measuring comprises implementing a spectrophotometer.

In another aspect of the presently described embodiments, the method comprises printing a first set of test patches of a selected first color in selected locations across a page, measuring the test patches, analyzing the test patches, and, calibrating the printer based on the scanned test patches in the selected locations.

In another aspect of the presently described embodiments, the method further comprises printing a second set of test patches of a selected second color in a first direction across the page parallel to the first set.

In another aspect of the presently described embodiments, the method further comprises printing a second set of test patches of a selected second color such that the first and second set of patches are interleaved.

In another aspect of the presently described embodiments, the measuring comprises scanning.

In another aspect of the presently described embodiments, the measuring comprises implementing a spectrophotometer.

In another aspect of the presently described embodiments, the color calibration comprises summing a grey balance contribution, a secondary color contribution and a primary color contribution for each of the selected locations.

In another aspect of the presently described embodiments, the color calibration comprises computing an arithmetic combination of two separations and using the computed combination and a third separation as addresses in a two dimensional lookup table.

In another aspect of the presently described embodiments, the method further comprises selecting sets of test patterns based on a desired number of colors to be used for calibration.

In another aspect of the presently described embodiments, the selecting of a desired number of colors results in a complete color calibration.

In another aspect of the presently described embodiments, the system comprises a test pattern generator operative to selectively generate test patterns for printing, a spatial correction module operative to selectively apply a spatial correction to the printer based on printed test patterns, and, a color correction module operative to selectively calibrate the printer based on the printed test pattern.

In another aspect of the presently described embodiments, the spatial correction module is operative to apply a spatially dependent correlating function based on a spatial location description.

In another aspect of the presently described embodiments, the color calibration module is operative to sum a grey balance contribution, a secondary color contribution and a primary color contribution.

In another aspect of the presently described embodiments, the color calibration comprises computing an arithmetic combination of two separations and using the computed combination and a third separation as addresses in a two dimensional lookup table.

In another aspect of the presently described embodiments, the system further comprises a measuring device operative to measure printed test patterns.

In another aspect of the presently described embodiments, the measuring device is integral to the system.

In another aspect of the presently described embodiments, the measuring device is a scanner.

In another aspect of the presently described embodiments, the measuring device is a spectrophotometer.

In another aspect of the presently described embodiments, the system comprises a test pattern generator operative to selectively generate test patches for printing, wherein a first set of test patches of a selected color are printed in selected locations across a page in a first direction, and, a calibration module operative to calibrate the printer based on the printed test patterns in the selected locations.

In another aspect of the presently described embodiments, the measuring device is integral to the system.

In another aspect of the presently described embodiments, the measuring device is a scanner.

In another aspect of the presently described embodiments, the measuring device is a spectrophotometer.

DETAILED DESCRIPTION

It is an objective of the presently described embodiments to use a spatial correction to improve the result of a printer calibration and correction. This may be accomplished by combining a low spatial frequency one-dimensional correction with a multiple axis printer correction algorithm. As such, according to the presently described embodiments, techniques for spatial correction and color calibration may be used in combination to achieve certain advantages in a printing process. These advantages are notably recognized in printing systems having multiple print stations, or multiple photoreceptors corresponding to unique color channels.

Figure 1:
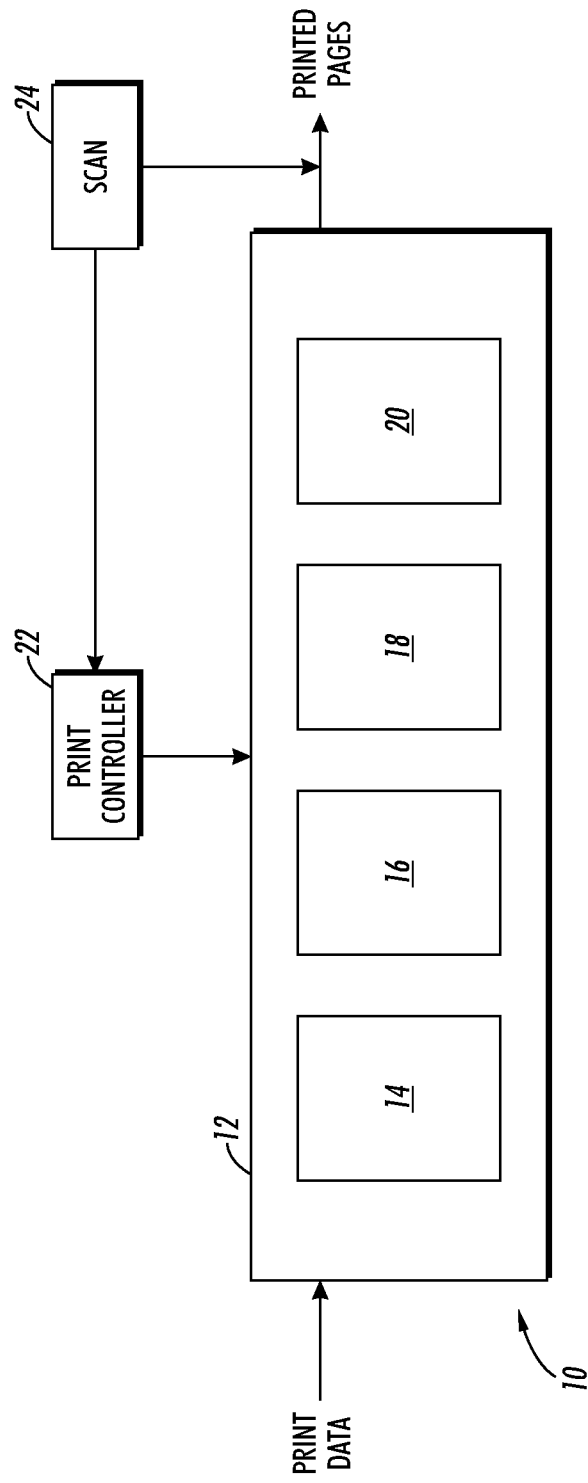
FIG. 1 is a block diagram of a system into which the presently described embodiments may be incorporated.

In this regard, with reference to FIG. 1, a system 10, into which the presently described embodiments may be incorporated, is illustrated. As shown, the system 10 includes a printer, or image rendering device, 12. The printer includes a plurality of print stations. As an example, print stations 14, 16, 18 and 20 are shown. The printer also includes a print controller 22, variations of which will be described in connections with FIGS. 3 and 5, and a scanning device 24. It should be understood that the configuration of the system 10 will vary from application to application and does not limit the implementation of the presently described embodiments. As an example, the scanning device 24 need not necessarily be incorporated into the system. A separate and/or stand-alone scanning or analysis station may be used to analyze the output of the image rendering device 12 to obtain data for input to the print controller 22.

Figure 2:
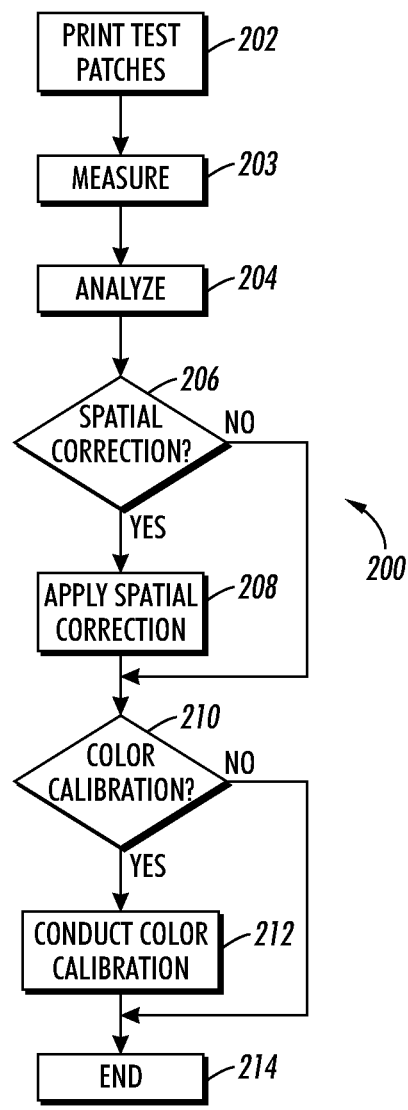
FIG. 2 is a flow chart illustrating a method according to the presently described embodiments.
Figure 4:
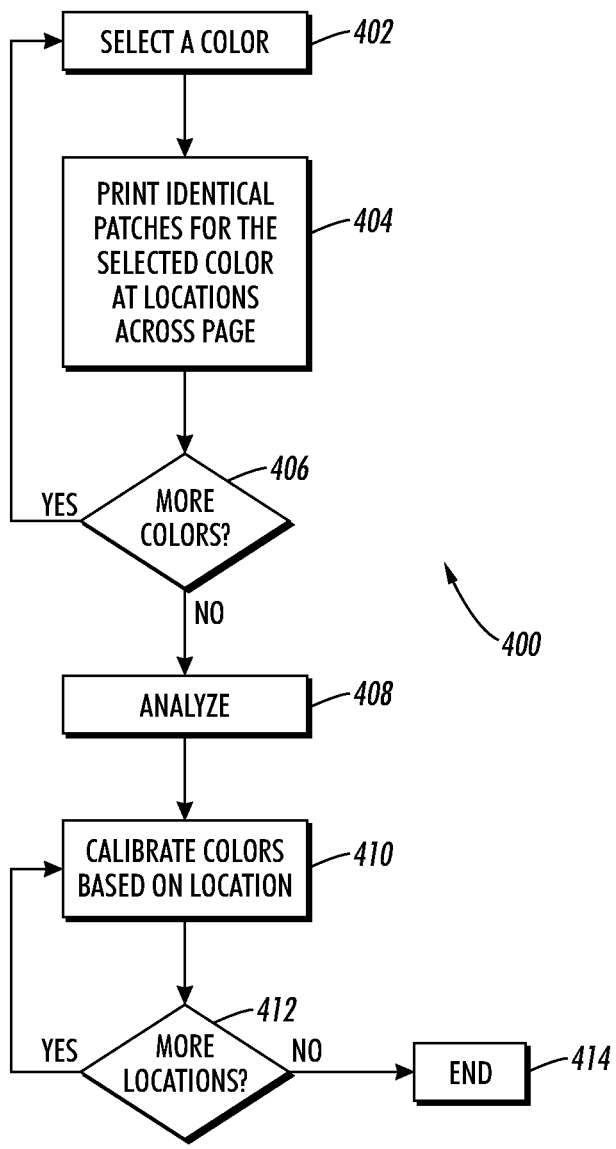
FIG. 4 is a flow chart according to the presently described embodiments.
Figure 5:
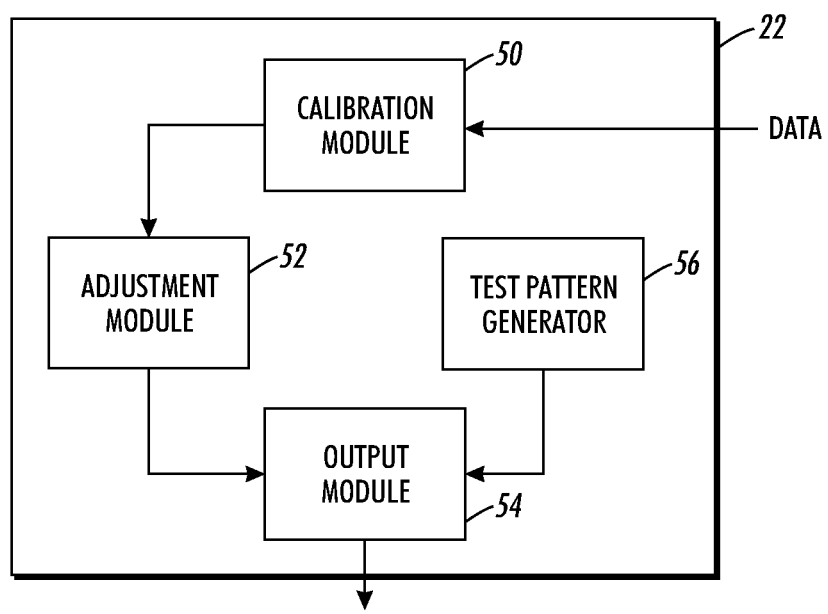
FIG. 5 is a block diagram of a print controller according to the presently described embodiments.

With reference to FIG. 2, a flow chart illustrating a method according to the presently described embodiments is illustrated. A flow chart illustrating another of the embodiments is shown in FIG. 4. It should be understood that the techniques according to the presently described embodiments may be implemented in a variety of hardware and software configurations. These configurations may take various forms as a function of the software and hardware platforms that are available for the application into which the presently described embodiments are being implemented. As an example, software routines corresponding to flow charts such as that shown in FIGS. 2 and 4 may be implemented by the print controller 22 and/or various combinations of the image rendering device 12 and scanner 24. In addition, the printer controller 22 may take a variety of forms as illustrated in FIGS. 3 and 5, as well as others.

With reference back to FIG. 2, a method 200 includes the printing of test patches (at 202). It should be understood that the printing of test patches can be accomplished in any manner that will achieve the objectives of the presently described embodiments. The patches may take a variety of configurations and include a variety of different data objectives. The test patches may also take on a variety of different shapes and sizes according to the objectives of the color correction process. In any event, the printed test patches are measured (at 203), and the measurements are analyzed (at 204) in a suitable manner to obtain data that will be useful to the print controller 22. The measurement may be conducted by a scanner, such as scanner 24. A measurement may also be conducted, at least in part, by other devices such a spectrophotometer. The analysis, in one form, is performed by the print controller 22 and may include assigning values to the printed test patches so a suitable processing of the data may be had.

In any such case, the analyzed data is used to make a determination as to whether a spatial correction should be applied to the printer (at 206). If a spatial correction is to be applied, an appropriate spatial correction technique is applied (at 208). After the spatial correction, or if it is determined that a spatial correction should not be applied, the process advances to determine whether a color calibration should be applied (at 210). This may be accomplished using the data obtained from the test patches noted above. Alternatively, another test pattern, with the spatial correction applied, may be printed, measured, and analyzed to do so. Of course, the test patches may be designed to target color issues in this process, as opposed to spatial issues. If appropriate, a suitable color calibration is conducted (at 212). If no color calibration technique is needed, then the process ends (at 214).

Figure 3:
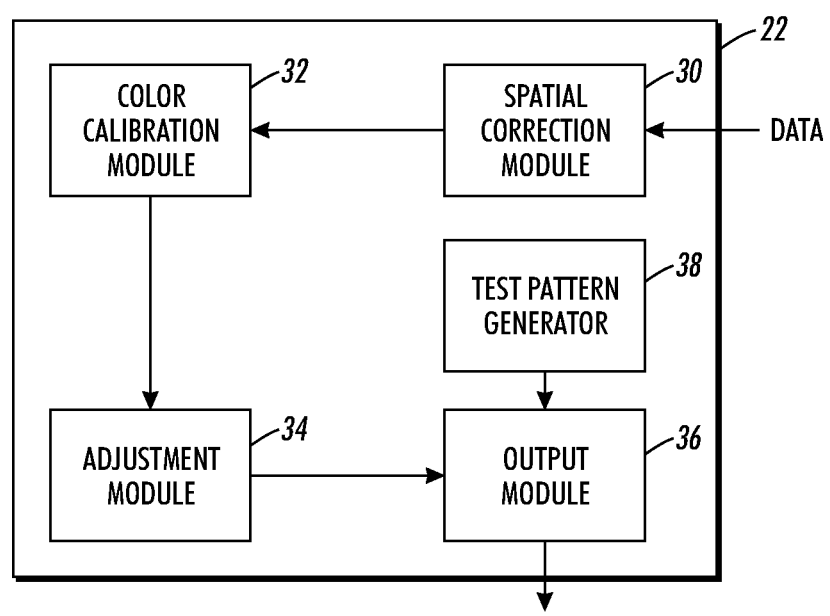
FIG. 3 is a block diagram of a print controller according to the presently described embodiments.

To implement a routine such as that shown in FIG. 2, with reference to FIG. 3, a print controller 22 is illustrated. As shown, the print controller 22 includes a spatial correction module 30 and a color calibration module 32. The print controller 22 also includes an adjustment module 34, as well as an output module 36. It should be understood that the print controller 22 also generates the test pattern, or test patches, that are printed by the system for use in the color correction process. As such, a test pattern generator 38 is provided to the print controller 22. It should be understood that the print controller 22 includes other functionality that is not illustrated for ease of reference and explanation of the presently described embodiments.

In this regard, it will be appreciated that the test pattern generator 38 is operative to selectively generate test patterns for printing. Likewise, the spatial correction module 30 is, in one form, operative to analyze data received from, for example, the scanner 24, and selectively apply a spatial correction to the printer based on printed test patterns. The color correction module 32 is operative to selectively calibrate the printer based on the printed test pattern. In one form, the spatial correction module is operative to apply a spatially dependent decorrelating function based on a spatial location description as described in, for example, U.S. Ser. No. 11/143,818, filed Jun. 2, 2005, entitled "Inter-Separation Decorrelator," (referred to as "Loce and Zhang") which is incorporated herein by reference in its entirety. In one form, as will be detailed below, the color calibration module is operative to sum a grey balance contribution, a secondary color contribution and a primary color contribution. Of course, the adjustment module 34 is operative to implement any adjustments to the printer or print controller that may be necessary to effect the results of the color calibration, such as adjusting color based on values that are calculated within the color calibration module 32.

The embodiments described in connection with FIGS. 1-3 provide for implementation of a spatial correction and a color calibration. In at least one form, the spatial correction is used to precondition the printer for implementation of an improved color calibration.

In this regard, in a traditional color calibration, the location of the test patches is a factor in correcting the color if there is spatial non-uniformity in the system. It should be understood that spatial non-uniformity will evidence itself where an identical test patch is printed in two different locations but appears differently in each of the locations. To overcome this difficulty, an impractical number of test patches would need to be printed at every viable location on the page if only a color calibration were used. However, according to the presently described embodiments, if a sufficient spatial correction is applied before conducting a color calibration, only a limited number of test patches will need to be printed for each level of color. For example, if the spatial correction is completely effective, then only one test patch per level of color need be printed. The result of this process will be the use of less paper, less toner, less operator time, etc. Even in situations where an imperfect spatial correction is applied, so long as at least some of the spatial non-uniformities are addressed, it is expected that an improved color correction process will result.

It should be understood that according to the presently described embodiments, especially those in connection with FIGS. 2 and 3, a variety of known spatial correction and/or color calibration techniques may be implemented.

In this regard, Loce and Zhang (i.e., U.S. Ser, No. 11/143, 818, filed Jun. 2, 2005, incorporated herein by reference) have implemented spatial correction as a four-dimensional look-up table mapping from CMYX to CMY, where X is horizontal position across the page. In addition, there is a potential one dimensional look-up table per pixel across the scan mapping from each separation to itself. The spatial correction includes applying a spatially dependent correlating function based on a spatial location description. This gives a good but not perfect correction. The correction generally leaves a residual side-to-side error of less than 2.5, occasionally as high as 2.8.

With Loce and Zhang's spatial correction, a residual side to side error of from 1.5 to 2.8 (DE) has been observed, depending on various environmental factors (humidity may be one such factor). Nonetheless, when two printers were calibrated to match after a spatial correction was applied, the difference between mean responses of the two printers was substantially reduced from what it was when they were calibrated without spatial correction. Specifically, a pair of printers was calibrated to match and then measured using the ANSI/ISO standard IT8.7/3 printer calibration page. The pages differed by 2.2 units of CIE $\Delta E_{ab}$ on average when calibrated without a spatial correction, but were brought to a difference of 1.5 of the same units when calibrated immediately after a spatial correction was calculated and applied.

Yao's printer calibration algorithm (U.S. Ser. No. 10/949, 600, filed Sep. 20, 2004, which is incorporated herein by reference) corrects the printer's response along the neutral axis, while simultaneously correcting along the lines from white to each of C, M, Y, K, CM, MY and YC. Briefly, Yao's method is to decompose an incoming CMY color into three components, correct each of them, and then combine the results. The components are, first, a grey component, which is equal to the minimum of C, M and Y; a secondary component, which is the minimum of the remaining two components once grey has been subtracted out; and, a primary component, which is the remaining C, M or Y after both the grey and secondary have been subtracted out. That is, the color calibration comprises summing a grey balance contribution, a secondary color contribution and a primary color contribution.

The grey component is corrected using a grey balance calibration. If the three components are initially equal, the entire procedure consists of grey balance correction, yielding total control over the neutral axis. The secondary component is corrected using DE from paper, with an optional hue correction. If there are only two equal non-zero components present, there is no grey to correct, and the entire process is an adjustment along the corresponding secondary axis, possibly adjusting the hue along the axis, analogous to a grey balance aim curve. If there is a primary component, it is adjusted using a linearization TRC, such as one that linearizes DE from paper (another transform could be used). In the case where only one separation was present in the first place, that separation is linearized in the same fashion as if a single component TRC were being used—typically DE from paper, but it could be linear in density space. Each of these three corrections gives an amount of C, M and Y, some of them zero, for a total of not more than 6 components. Matching components are summed to give the total corrected amount.

Another color calibration technique that may be used is described in U.S. Ser. No. 10/465,408, entitled "Two-Dimensional Calibration Architecture for Color Devices," and bearing Publication No. US 2004/0257595, which is incorporated herein by reference. This method is similar, although it offers somewhat better performance at the expense of slightly less control. Two dimensional look-up tables mapping from a separation and an arithmetic combination of the other two are used to map to the corrected separation. Full control over the neutral axis is available, as well as along the primaries. However, the secondaries are compromises, as control is over both secondaries with the same part of the table. Yellow, for example, is adjusted in the same way along the red axis as along the green axis.

The embodiments thus far have been described in terms of a spatial correction being applied to precondition the printer for an improved color calibration. However, it should be understood that two distinct processes are not necessarily used. Another embodiment is to make a moderate number of measurements to obtain an approximate spatial correction only along the axes controlled by, for example, Yao's color correction. The same value would be printed at each location across the page, and multiple values down the page. In the event that banding is also being characterized, additional locations down the page, appropriately spaced, could also be printed with the same value.

In this regard, with reference to FIG. 4, a method according to the presently described embodiments is illustrated. In this regard, the method 400 includes selecting a color (at 402). Identical patches for the color are then printed at selected locations across a page (at 404). A determination is then made as to whether more colors are desired to be printed (at 406). If so, 404 and 406 are repeated. It should be understood that this may be a predetermined process that is preconfigured into the test pattern generator, for example. Once an entire color set is complete, the colors are measured and analyzed (at 408). As above, the measurement may be conducted by a scanner, such as scanner 24. A measurement may also be conducted, at least in part, by other devices such a spectrophotometer. This analysis may include the assignment of values to the printed test patches so a suitable processing of the data may be had. From each of these measurements, which may be made using a scan bar which is either attached to the output of the printer or in a separate scan station, a spline or other one-dimensional function may be fit to the tone response at each pixel.

It is not uncommon for low frequency spatial variations to dominate the variation from side to side on a page. For example, various processes may lead to a variation from one side of the page to the other that may be described using a linear or quadratic function. In such a case, printing the same color of patch at every location across the page is not needed. Instead a small number of patches, enough to characterize the variation, may be printed at locations more or less evenly spaced across the page for one color, and then patches of other colors may similarly be printed at locations between those of the first color. For example, the spatial variation of ten different colors might be characterized by making every tenth patch the same color in a sequence that runs across the page.

As such, the printer is then calibrated based on the test patches that correspond to a selected location across the page (at 410). Also, an average may be calculated for each level, averaging across the page. From the average, and the measured value of the pixel, a correction amount can be calculated. This amount would be converted from measurement space to colorant space, using the tone response curve for that pixel. Then, the correction amount may be modeled, for example, as a one-dimensional spline across the page for each level, or as a two-dimensional spline function of level and position. Other correction functions may be also be used, such as a single quadratic, given information about the expected spatial variation of that model of printer.

A determination is then made whether more locations are to be calibrated (at 412). If so, the calibrations for each of the other locations are conducted.

This can be done for each of the controlled colors, sampling at, e.g., 8 to 16 levels, each. In a scanner-based measurement patches as small as 2.5 mm on a side may be readily measured using techniques described in, for example, U.S. application Ser. No. 11/170,873, filed Jun. 30, 2005, entitled "Color Characterization or Calibration Targets with Noise-Dependent Patch Size or Number," by R. Victor Klassen; U.S. application Ser. No. 11/170,975, filed Jun. 30, 2005, entitled "Method and System for Processing Scanned Patches for Use in Imaging Device Calibration," by R. Victor Klassen; U.S. application Ser. No. 11/268,294, filed Nov. 4, 2005, entitled "A Method for Correcting Integrating Cavity Effect for Calibration and/or Characterization Targets,", by R. Victor Klassen; and, U.S. application Ser. No. 60/733,467, filed Nov. 4, 2005, entitled "Scanner Characterization for Printer Calibration," by R. Victor Klassen, all of which are incorporated herein by reference. On A3 paper nearly 20,000 patches of this size may be printed in 168 rows. If 10 colors are characterized per row, this allows 1680 colors to be simultaneously characterized for spatial variation, and color calibration. This is sufficient to do an acceptable job of calibrating a printer along the neutral axis, as well as along each of the primary and secondary axes, using the method of Yao or the method of Sharma and Bala. A better result may be achieved by scanning multiple pages. A separate calibration is computed at each location where a given color is printed.

If no further calibrations are desired, the process is ended (at 414).

The above-mentioned corrections would then be used to produce either a TRC per pixel or one at some sampling interval of pixels, which would later be interpolated, depending on space/time tradeoffs. Various well-known methods of interpolating may be used, such as linearly interpolating between the amounts of colorant resulting from the calibration to obtain calibrated values in between the measured locations, or fitting a function through the values computed at the measured locations and interpolating that function for in-between values.

The method described above can be used either in concert with Loce/Zhang correction which would be calibrated infrequently, or, for printers on which it is good enough on its own, it could be used without. It would typically be calculated as frequently as the printer color calibration is updated.

With reference to FIG. 5, a print controller implementing the routine of FIG. 4 is illustrated. As shown, the print controller 22 includes a calibration module 50. Also included within the print controller is an adjustment module 52 and an output module 54. Like the print controller 22 of FIG. 3, a test pattern generator is also included within the print controller. As such, test pattern generator 56 is shown.

It will be understood that the test pattern generator 56 is operative to selectively generate test patches for printing. In one form, a first set of test patches of a selected color is printed in selected locations across a page in a first direction. Also, a second set of test patches of a selected second color may be printed in a first direction across the page, the printing of the second set of patches being offset from the first set of patches in a second direction. In addition, the calibration module 50 is operative to calibrate the printer based on the printed test patterns in the selected locations. For example, the calibration module 50 is operative to calibrate colors of all test patches associated with a selected location across the page. In one form, the calibration module 50 is operative to sum a grey balance contribution, a secondary color contribution and a primary color contribution.

Figure 6:
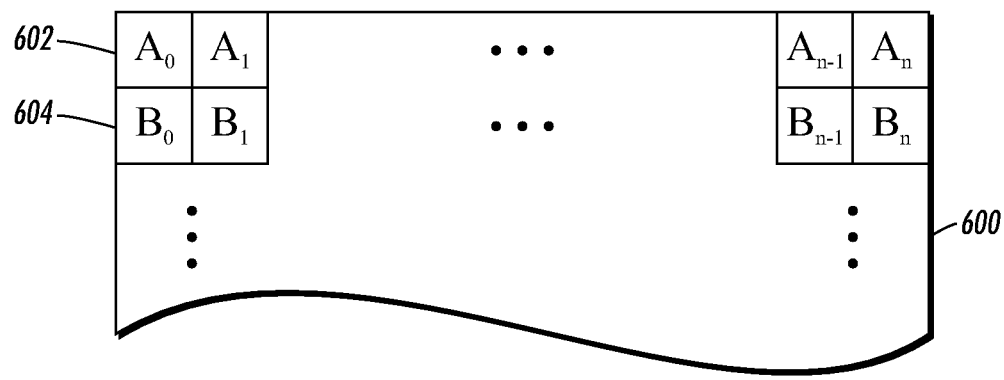
FIG. 6 is an illustration of an implementation of the presently described embodiments; and, FIG. 7 is an illustration of an implementation of the presently described embodiments.

To further illustrate an implementation of the presently described embodiments, with reference to FIG. 6, a page having test patches printed thereon according to the routine shown in FIG. 4 is illustrated. The page 600 includes rows 602 and 604 which include identical test patches, respectively, for colors A and B. As shown, the row 602 includes test patches A0, A1, . . . A(n−1), An. This row of test patches relates to a color or level of a color. Also shown is row 604 having test patches B0, B1 . . . B(n−1), Bn, printed across. This row of test patches relates to a different color or level of color than that represented in row 602. It will be understood that the calibrations that are had in connection with the presently described embodiments (e.g. FIGS. 4 and 5) are conducted on a position by position basis. So, a calibration is conducted for the column of patches including A0, B0, . . . etc. Another calibration is conducted for the column of patches A1, B1, . . . etc. Because calibrations are completed for each column along the width of the page, spatial uniformities are necessarily addressed in the process.

Figure 7:
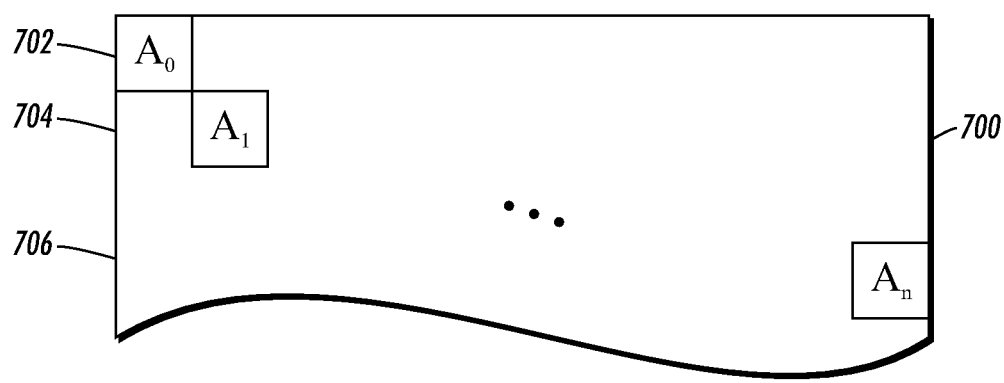

With reference to FIG. 7, further embodiments of the presently described embodiments are shown. As shown in FIG. 7, test patches A0 through An are printed not in a single row but offset in different rows. As shown, the page 700 includes a row 702 that has patch A0 printed thereon, a row 704 that has patch A1 printed thereon and a row 706 having patch An printed thereon. In this manner, the effects of undesired banding may be averaged out.

Finally, with measurement of additional colors or color levels, one may calculate the spatial and color corrections as a single comprehensive operation. In this way, the aim of the spatial correction TRCs may match that of the color correction, thereby eliminating one processing step when applying the calibration. If the spatial correction TRCs handle the eight axes and map them to the right values, there is no remaining work left for the color correction to do.

In the case of tightly integrated parallel printing where the printer comprises multiple integrated marking engines, the scan bar would serve as a single instrument reading the states of both or all marking engines. It would preferably be built into the output path of the system where it can scan pages from either engine.

In the case of the measurements being made on a separate scan station, multiple printers could be measured and matched. In such a case, the calibration pages, when printed, would be marked with the identification of the printer and preferably the time, so that it is clear to the system which pages belong to which printer and whether they are current.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for adjusting output of a printer, the method comprising:
   printing a first set of identical test patches of a selected first color in selected locations evenly spaced across a page;
   printing a second set of identical test patches of a selected second color in a direction across the page parallel to the first set;
   measuring the test patches;
   analyzing the test patches; and,
   calibrating the printer based on the test patches in the selected locations.

2. The method as set forth in claim 1 wherein the measuring comprises scanning.

3. The method as set forth in claim 1 wherein the measuring comprises using a spectrophotometer.

4. A method for adjusting output of a printer, the method comprising:
   printing a first set of identical test patches of a selected first color in selected locations evenly spaced across a page;
   printing a second set of identical test patches of a selected second color such that the first and second set of patches are interleaved;
   measuring the test patches;
   analyzing the test patches; and,
   calibrating the printer based on the test patches in the selected locations.

5. The method as set forth in claim 4 wherein the measuring comprises scanning.

6. The method as set forth in claim 4 wherein the measuring comprises using a spectrophotometer.

7. A method for adjusting output of a printer, the method comprising:
   printing a first set of identical test patches of a selected first color in selected locations evenly spaced across a page;
   measuring the test patches;
   analyzing the test patches; and,
   calibrating the printer based on the test patches in the selected locations, wherein the calibrating comprises summing a grey balance contribution, a secondary color contribution and a primary color contribution for each of the selected locations.

8. The method as set forth in claim 7 wherein the measuring comprises scanning.

9. The method as set forth in claim 7 wherein the measuring comprises using a spectrophotometer.

10. A method for adjusting output of a printer, the method comprising:
    printing a first set of identical test patches of a selected first color in selected locations evenly spaced across a page;
    measuring the test patches;
    analyzing the test patches; and,
    calibrating the printer based on the test patches in the selected locations, wherein the calibrating comprises computing an arithmetic combination of two separations and using the computed combination and a third separation as addresses in a two dimensional lookup table.

11. The method as set forth in claim 10 wherein the measuring comprises scanning.

12. The method as set forth in claim 10 wherein the measuring comprises using a spectrophotometer.

13. A method for adjusting output of a printer, the method comprising:
- printing a first set of identical test patches of a selected first color in selected locations evenly spaced across a page;
- measuring the test patches;
- analyzing the test patches; and,
- calibrating the printer based on the test patches in the selected locations, further comprising selecting sets of test patterns based on a desired number of colors to be used for the calibrating.

14. The method as set forth in claim 13 wherein the selecting of a desired number of colors results in a complete color calibration.

15. The method as set forth in claim 13 wherein the measuring comprises scanning.

16. The method as set forth in claim 13 wherein the measuring comprises using a spectrophotometer.

17. A system for adjusting output color of a printer, the system comprising:
- a test pattern generator operative to selectively generate test patches for printing, wherein a set of identical test patches of a selected color is printed in selected locations evenly spaced across a page; and,
- a calibration module operative to calibrate the printer based on the printed test patches in the selected locations, wherein the calibration comprises summing a grey balance contribution, a secondary color contribution and a primary color contribution for each of the selected locations.

18. The system as set forth in claim 17 further comprising a measuring device integral to the system.

19. The system as set forth in claim 17 further comprising a measuring device including a scanner.

20. The system as set forth in claim 17 further comprising a measuring device including a spectrophotometer.

* * * * *